United States Patent
Verma

(10) Patent No.: US 8,600,058 B2
(45) Date of Patent: Dec. 3, 2013

(54) GENERATION OF SELF-CERTIFIED IDENTITY FOR EFFICIENT ACCESS CONTROL LIST MANAGEMENT

(75) Inventor: Sanjeev Verma, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 786 days.

(21) Appl. No.: 12/413,280

(22) Filed: Mar. 27, 2009

(65) Prior Publication Data

US 2010/0251348 A1    Sep. 30, 2010

(51) Int. Cl.
*H04L 9/00*      (2006.01)
*H04L 29/06*   (2006.01)
*H04L 9/32*      (2006.01)
*H04K 1/00*     (2006.01)
*G06F 7/04*     (2006.01)

(52) U.S. Cl.
USPC ............. 380/268; 380/270; 726/5; 726/10; 726/19; 713/150; 713/155; 713/159; 713/175

(58) Field of Classification Search
USPC ............ 380/268, 270; 726/2, 5, 10, 19; 713/150, 155, 159, 175
See application file for complete search history.

(56) References Cited

U.S. PATENT DOCUMENTS

| | | | |
|---|---|---|---|
| 7,607,015 B2 * | 10/2009 | Fascenda | 713/171 |
| 7,821,955 B2 * | 10/2010 | Morikuni et al. | 370/252 |
| 2004/0068653 A1 * | 4/2004 | Fascenda | 713/168 |
| 2005/0027984 A1 * | 2/2005 | Saito et al. | 713/168 |
| 2007/0173229 A1 * | 7/2007 | Dong et al. | 455/411 |
| 2008/0098088 A1 * | 4/2008 | Tamano et al. | 709/218 |
| 2008/0162934 A1 * | 7/2008 | Okawa | 713/169 |
| 2009/0083846 A1 * | 3/2009 | Ding | 726/12 |
| 2009/0253409 A1 * | 10/2009 | Slavov et al. | 455/411 |
| 2010/0169646 A1 * | 7/2010 | Zhang et al. | 713/171 |
| 2010/0198954 A1 * | 8/2010 | Grasso et al. | 709/223 |

OTHER PUBLICATIONS

"UPnP Forum Releases New Security Specifictions for Industry Review", Cover Pages, Hosted by OASIS, Aug. 22, 2003, http://xml.coverpages.org/ni2003-08-22-1.html.

* cited by examiner

*Primary Examiner* — Mohammad W Reza
(74) *Attorney, Agent, or Firm* — Kenneth L. Sherman, Esq.; Michael Zarrabian, Esq.; Sherman & Zarrabian LLP

(57) ABSTRACT

In a first embodiment of the present invention, a method for registering a new device to a control point in a home network is provided, the method comprising: generating a first self-certified identification at the control point, the generation using a pseudo-random generated number and using an identification of the control point; and sending a secure message to the new device containing the first self-certified identification.

20 Claims, 4 Drawing Sheets

GENERATION OF SELF-CERTIFIED IDENTITY FOR EFFICIENT ACCESS CONTROL LIST MANAGEMENT

BACKGROUND OF THE INVENTION

1. Field of the Invention

The present invention relates to home networks. More particularly, the present invention relates to the generation of self-certified identity for efficient access control list management in a home network.

2. Description of the Related Art

Universal Plug and Play (UPnP) is a distributed, open networking architecture that allows devices to connect seamlessly and to simplify the implementation of networks in the home (data sharing, communications, and entertainment) and corporate environments. UPnP achieves this by defining and publishing UPnP device control protocols built upon open, Internet-based communication standards.

UPnP has grown in popularity of late in part due to the rise in popularity of media servers. Media servers are small computers that store multiple types of content (e.g., photos, music, videos, etc.). The content may then be streamed from a media server to one or more control points (e.g., iPod, television set, etc.).

As an example, a "Media Server" device might contain a significant portion of the homeowner's audio, video, and still-image library. In order for the homeowner to enjoy this content, the homeowner must be able to browse the objects stored on the Media Server, select a specific one, and cause it to be "played" on an appropriate rendering device.

For maximum convenience, it is highly desirable to allow the homeowner to initiate these operations from a variety of User Interface (UI) devices. In most cases, these UI devices will either be a UI built into the rendering device, or a standalone UI device such as a wireless PDA or tablet. In other cases, the home network user interface device could be more remote and communicate with the home network through a tunneling mechanism on the Internet.

In some systems, it is desirable to provide access control mechanisms to UPnP clients. One example would be where some of the files accessible over the UPnP network are confidential. Another example would be where some of the files accessible over the UPnP network are of an adult nature and thus children should be restricted from viewing or playing them. UPnP has a facility for the use of Access Control Lists (ACLs), but the management of ACLs across multiple UPnP devices can be challenging. There is a need for simple and secure solutions to provide copying of ACLs between devices.

SUMMARY OF THE INVENTION

In a first embodiment of the present invention, a method for registering a new device to a control point in a home network is provided, the method comprising: generating a first self-certified identification at the control point, the generation using a pseudo-random generated number and using an identification of the control point; and sending a secure message to the new device containing the first self-certified identification.

In a second embodiment of the present invention, a method for copying access control list entries from a first device in a home network to a second device in a home network is provided, the method comprising: sending a request to access the access control list (ACL) entries from a control point to the first device, the request including a self-certified identification of the control point, wherein the self-certified identification was generated using pseudo-random generated number and using an identification of the control point; accessing the ACL entries on the first device after the first device authenticates the self-certified identification; sending a request to access an ACL from a control point to the second device, the request including the self-certified identification of the control point; and copying the ACL entries from the first device to the second device after the second device authenticates the self-certified identification.

In a third embodiment of the present invention, a method for registering a new device to a control point in a home network is provided, the method comprising: receiving a first control point self-certified identification at the new device from the control point; storing the first control point self-certified identification; maintaining a list of ACL entries; and upon receiving a request to access the ACL entries from a potentially new control point, authenticating the potentially new control point by comparing the first control point self-certified identification to a second control point self-certified identification provided by the potentially new control point.

In a fourth embodiment of the present invention, a control point in a home network is provided, the control point comprising: means for generating a first self-certified identification at the control point, the generation using a pseudo-random generated number and using an identification of the control point; and means for sending a secure message to the new device containing the first self-certified identification.

In a fifth embodiment of the present invention, a control point in a home network is provided, the control point comprising: means for sending a request to access the access control list (ACL) entries from the control point to the first device, the request including a self-certified identification of the control point, wherein the self-certified identification was generated using pseudo-random generated number and using an identification of the control point; means for accessing the ACL entries on the first device after the first device authenticates the self-certified identification; means for sending a request to access an ACL from a control point to the second device, the request including the self-certified identification of the control point; and means for copying the ACL entries from the first device to the second device after the second device authenticates the self-certified identification.

In a sixth embodiment of the present invention, a new device in a home network is provided, comprising: means for receiving a first control point self-certified identification at the new device from the control point; means for storing the first control point self-certified identification; means for maintaining a list of ACL entries; and means for, upon receiving a request to access the ACL entries from a potentially new control point, authenticating the potentially new control point by comparing the first control point self-certified identification to a second control point self-certified identification provided by the potentially new control point.

In a seventh embodiment of the present invention, a program storage device readable by a machine is provided, tangibly embodying a set of computer instructions executable by the machine to perform a method for registering a new device to a control point in a home network, the method comprising: generating a first self-certified identification at the control point, the generation using a pseudo-random generated number and using an identification of the control point; and sending a secure message to the new device containing the first self-certified identification.

In an eighth embodiment of the present invention, a program storage device readable by a machine is provided, tangibly embodying a set of computer instructions executable by the machine to perform a method for copying access control list entries from a first device in a home network to a second device in a home network, the method comprising: sending a request to access the access control list (ACL) entries from a control point to the first device, the request including a self-certified identification of the control point, wherein the self-certified identification was generated using pseudo-random generated number and using an identification of the control point; accessing the ACL entries on the first device after the first device authenticates the self-certified identification; sending a request to access an ACL from a control point to the second device, the request including the self-certified identification of the control point; and copying the ACL entries from the first device to the second device after the second device authenticates the self-certified identification.

In a ninth embodiment of the present invention, a program storage device readable by a machine is provided, tangibly embodying a set of computer instructions executable by the machine to perform a method for registering a new device to a control point in a home network, the method comprising: receiving a first control point self-certified identification at the new device from the control point; storing the first control point self-certified identification; maintaining a list of ACL entries; and upon receiving a request to access the ACL entries from a potentially new control point, authenticating the potentially new control point by comparing the first control point self-certified identification to a second control point self-certified identification provided by the potentially new control point.

DETAILED DESCRIPTION OF SPECIFIC EMBODIMENTS

Figure 1:
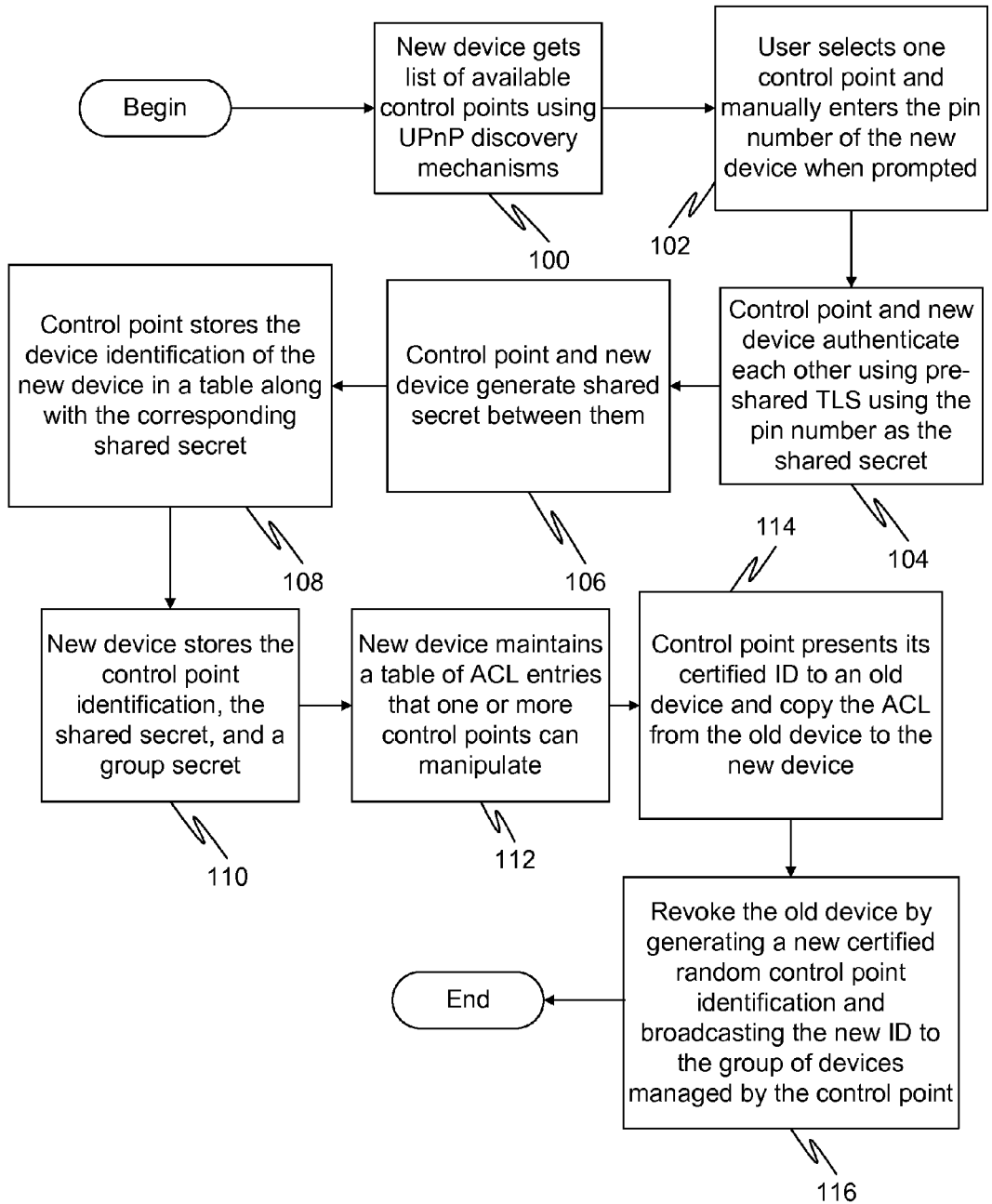
FIG. 1 is a flow diagram illustrating a method for registering a new device to a control point in a home network in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

It should be noted that the term "home networking" as used throughout this document refers to a type of network that is commonly used in homes to connect media devices. There is no requirement, however, that this type of networking actually be used in homes, as it has equal applicability for use in businesses or other entities. As such, the term "home networking" shall not be construed as limiting any embodiments of the present invention to use in a home, and shall be interpreted as any type of local area network (LAN). For purposes of this document, the term "control point" shall be interpreted to mean any client device in a home network.

In an embodiment of the present invention, effective ACL management in a UPnP network is accomplished using a shared key mechanism by generating self-certified control point identities.

In one embodiment of the invention, it is assumed that preshared transport layer security (TLS), such as RFC 4279, is used to provide secure communications between UPnP devices and control points. A device personal identification number (PIN) then can be used as a weak secret during the initial handshake between control point and device in order to generate a strong secret. A control point can manage a number of devices. The control point then uses the strong shared secret to transport a group secret to a device. Thus, the control point and a group of devices that are managed by the control point all share a group secret. It should be noted that the term PIN or pin number should be construed broadly to refer to any combination of alphanumeric characters, and should not be limited to numbers.

The UPnP control point needs to be uniquely identified in order to copy ACL entries from one device to another. Therefore, in an embodiment of the present invention, the UPnP control point generates a self-certified identify using a Pseudo-Random function with the Control Point name and an internally generated random number as inputs. For added security, the identity of the control point is periodically changed through an internally generated random number. The identity of the control point is broadcast to all the devices managed by the control point using a group secret.

Each device then can maintain the ACL entries along with a certified identity of the control point that has the right to copy entries. For example, when an old media server is replaced by a new media server, the control point can simply copy the ACL entries from the old media server to the new media server. The copying operation is straightforward since the control point is identified through the same certified control point identity. The control point can then generate a new control point identity using a Pseudo Random function by locally generating a new random number and distribute the new control point identity to the new group of active control points (eliminating the old media server from the group). This way a control point can isolate an old media server from any further operation.

FIG. 1 is a flow diagram illustrating a method for registering a new device to a control point in a home network in accordance with an embodiment of the present invention. This diagram illustrates the steps from the standpoint of the system as a whole. At 100, the new device gets a list of available control points using UPnP discovery mechanisms. At 102, a user selects one control point and manually enters the pin number of the new device when prompted. At 104, the control point and the new device authenticate each other using pre-shared TLS using the pin number as the shared secret. After this authentication is complete, the secured handshake has been completed, and thus at 106, both the control point and the new device generate a shared secret between them. At 108, the control point stores the device identification of the new device in a table along with the corresponding shared secret. At 110, the new device stores the control point identification, the shared secret, and a group secret.

At 112, the new device maintains a table of ACL entries that one or more control points can manipulate. The ACL table lists the random certified IDS of the appropriate control points. At 114, the control point can present its certified ID to an old device and copy the ACL from the old device to the new device. At 116, the old device is revoked by generated a new certified random control point identification and broadcasting the new ID to the group of devices managed by the control point.

Figure 2:
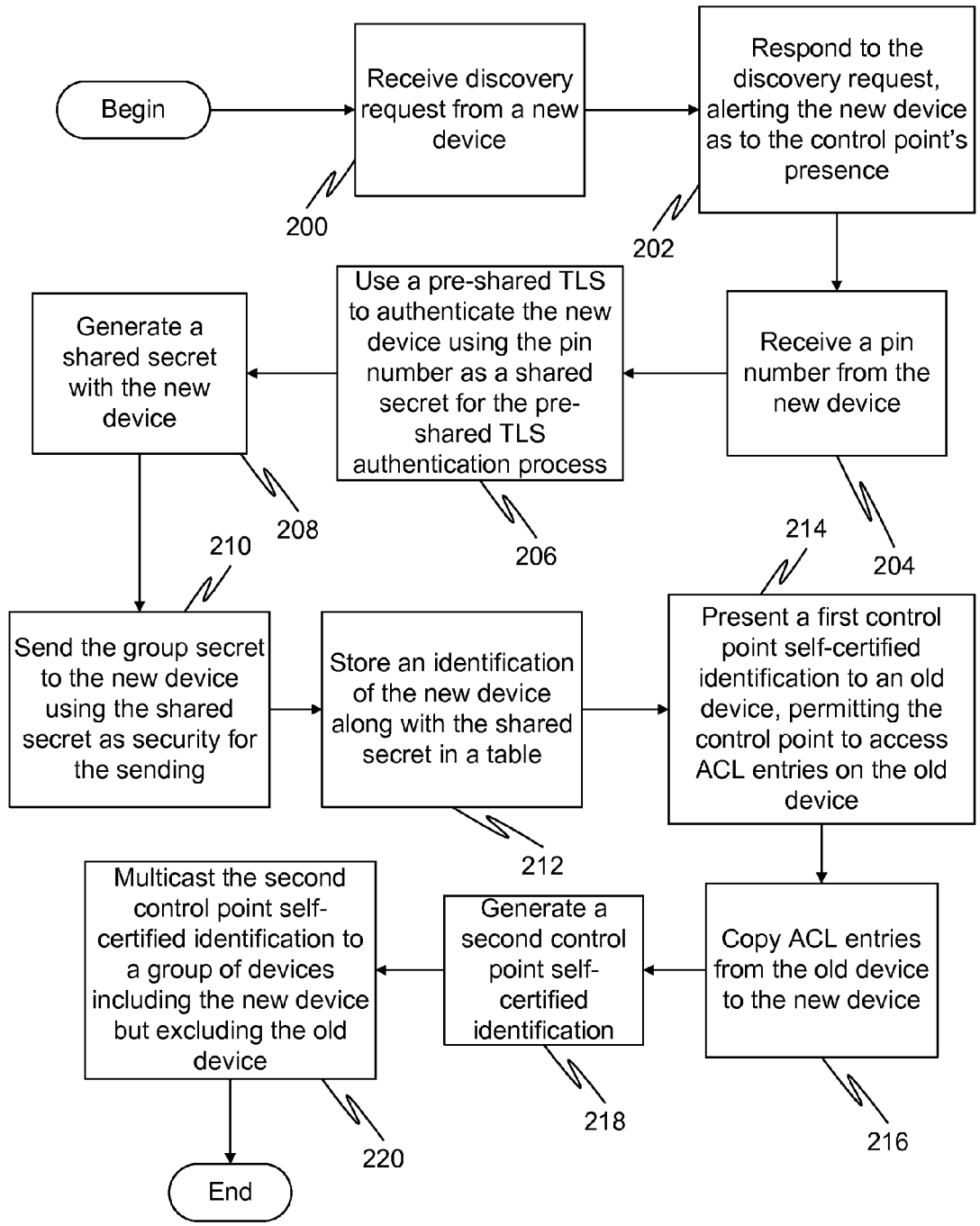
FIG. 2 is a flow diagram illustrating a method for registering a new device to a control point in a home network in accordance with another embodiment of the present invention.

FIG. 2 is a flow diagram illustrating a method for registering a new device to a control point in a home network in accordance with another embodiment of the present invention. This diagram illustrates the steps from the standpoint of the control point. At 200, a discovery request is received from a new device. At 202, the control point responds to the discovery request, alerting the new device as to the control point's presence. At 204, a pin number is received from the new device. At 206, pre-shared TLS is used to authenticate the new device using the pin number as a shared secret for the pre-shared TLS authentication process. At 208, a shared secret is generated with the new device. At 210, the group secret is sent to the new device using the shared secret as security for the sending. This group secret was previously pseudo-randomly generated by the control point. At 212, the control point stores an identification of the new device along with the shared secret in a table.

At 214, the control point presents a first control point self-certified identification to an old device, permitting the control point to access ACL entries on the old device. This identification was previously generated by the control point, in one embodiment by using a pseudo-random function with the control point name and a pseudo-random number as inputs. At 216, the control point copies ACL entries from the old device to the new device. At 218, a second control point self-certified identification is generated. Like the first control point self-certified identification, the second control point self-certified identification may be generated by the control point by using a pseudo-random function with the control point name and a pseudo-random number as inputs. At 220, the second control point self-certified identification is multicast to a group of devices including the new device but excluding the old device. This excludes the old device from the group.

It be noted that, throughout this document, the terms "first control point self-certified identification" and "second control point self-certified identification" are used. The "first" and "second" in these terms are provided to differentiate between two identifications of the same control point (e.g., where the identification of the control point changes), and are not intended to imply that the identifications are of different control points.

Figure 3:
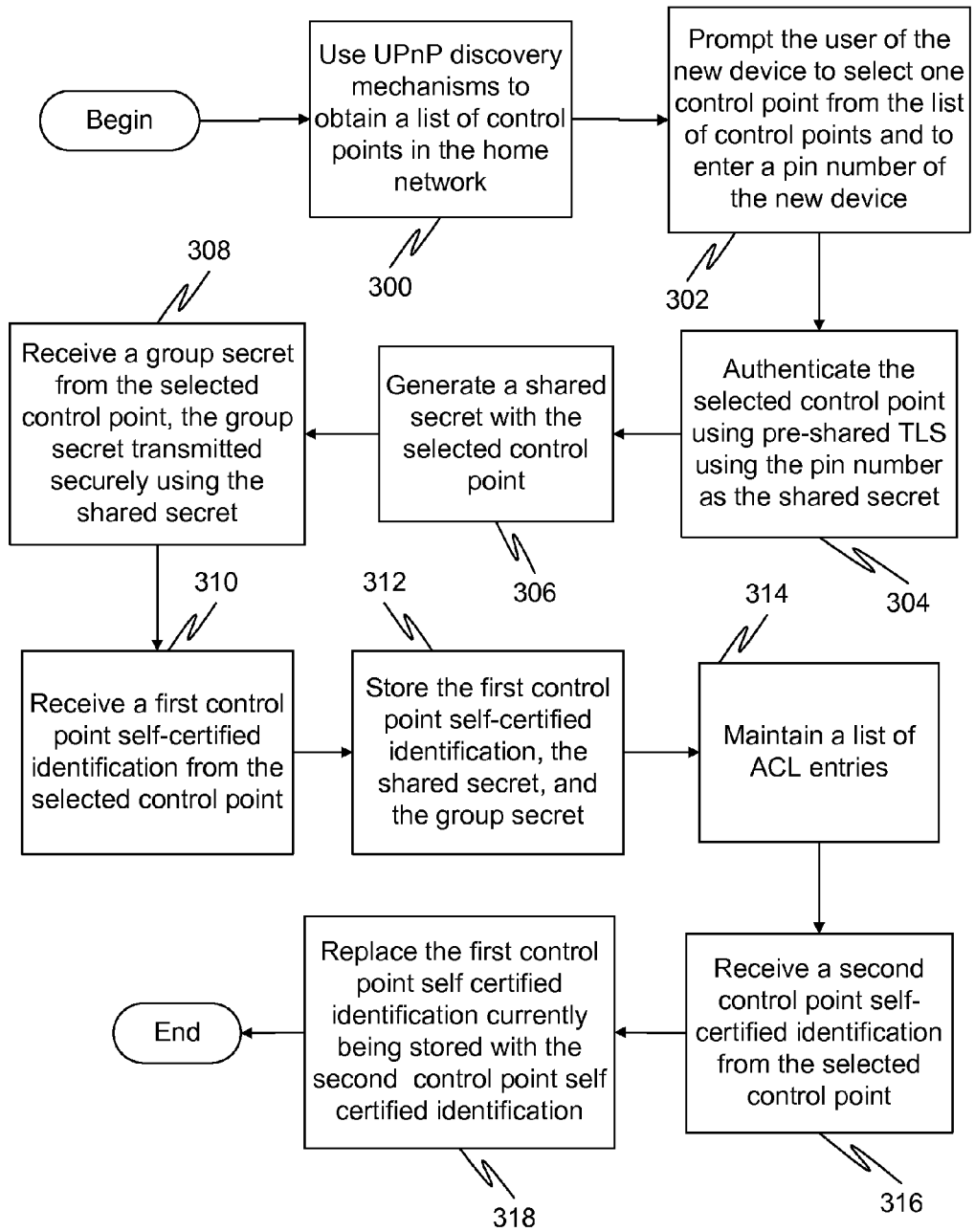
FIG. 3 is a flow diagram illustrating a method for registering a new device to a control point in a home network in accordance with another embodiment of the present invention.

FIG. 3 is a flow diagram illustrating a method for registering a new device to a control point in a home network in accordance with another embodiment of the present invention. This diagram illustrates the steps from the standpoint of the new device. At 300, UPnP discovery mechanisms are used to obtain a list of control points in the home network. At 302, a user of the new device is prompted to select one control point from the list of control points and to enter a pin number of the new device. At 304, the selected control point is authenticated using pre-shared TLS using the pin number as the shared secret. At 306, a shared secret is generated with the selected control point. At 308, a group secret is received from the selected control point, the group secret transmitted securely using the shared secret.

At 310, a first control point self-certified identification is received from the selected control point. At 312, the first control point self-certified identification, the shared secret, and the group secret are stored. At 314, a list of ACL entries is maintained. At 316, a second control point self-certified identification is received from the selected control point. At 318, the first control point self-certified identification currently being stored is replaced by the second control point self-certified identification.

The present invention is superior to, for example, a certificate-based approach because revocation of a certificate can be very complicated in a home network, and a certificate-based approach would also require more complex calculations.

Figure 4:
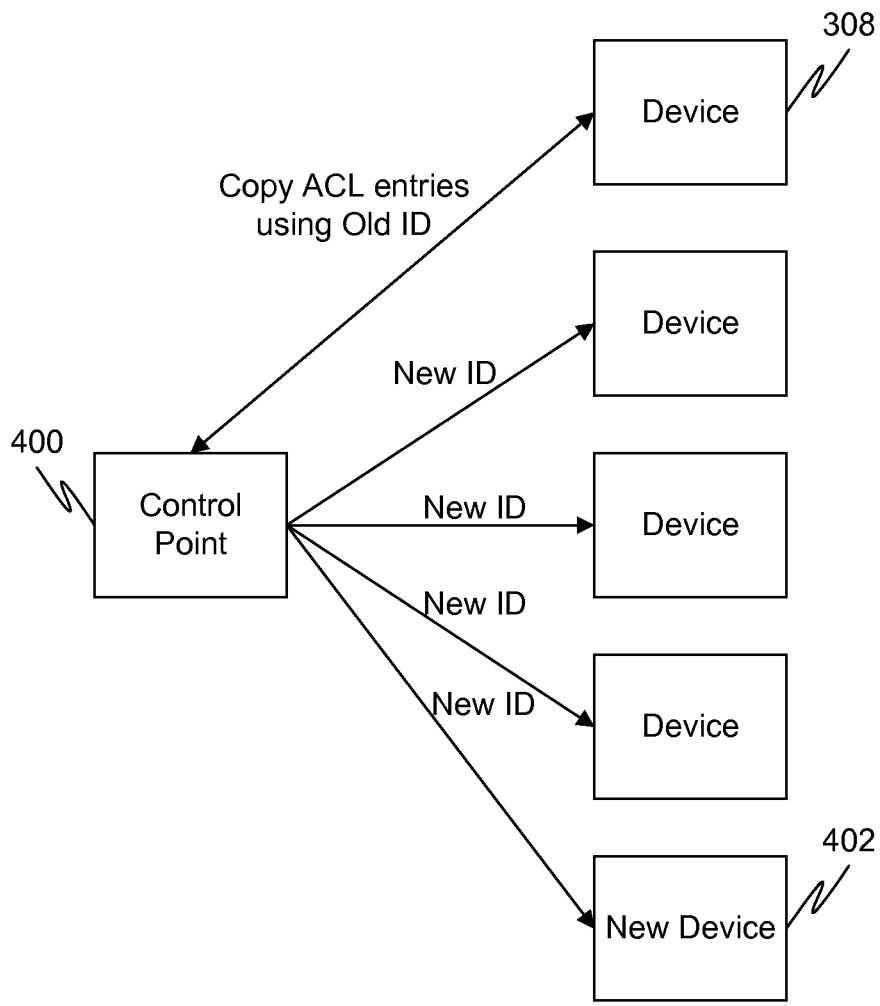
FIG. 4 is a block diagram illustrating a system architecture for a home network in accordance with an embodiment of the present invention.

FIG. 4 is a block diagram illustrating a system architecture for a home network in accordance with an embodiment of the present invention. Control point 400 performs the steps described above with respect to FIG. 2 and new device 402 performs the steps described above with respect to FIG. 3. When it comes time for the control point 400 to remove old device 404 from the group, control point 400 generates a new control point self-certified identification and broadcasts it to the group, excluding old device 404. Specific steps may be performed by specialized software modules within control point 400.

It should be noted that a control point is a device in the home network, and as such nothing in this document should preclude the possibility of the "new device" or "old device" from being a control point.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for registering a new device to a control point in a home network, the method comprising:

generating a first self-certified control point device identification at the control point, the self-certified control point device identification uniquely identifying the control point, wherein a pseudo-random function uses a control point device identification name and a generated pseudo-random number for inputs for generating the first self-certified control point device identification; and sending a secure message to the new device containing the first self-certified control point device identification.

2. The method of claim 1, further comprising:
receiving a discovery request from the new device; and
responding to the discovery request with the first self-certified control point device identification of the control point.

3. The method of claim 1, wherein the home network is a Universal Plug and Play (UPnP) network.

4. The method of claim 1, further comprising:
receiving a pin number from the new device;
using pre-shared transport layer security to authenticate the new device using the pin number as input for the pre-shared transport layer security authentication process;
generating, by the control point and the new device, a shared secret between the control point and the new device; and
sending a group secret to the new device.

5. The method of claim 4, further comprising:
storing, by the control point, an identification of the new device along with the shared secret in a table; and
storing, by the new device, the first self-certified control point device identification, the shared secret and the group secret.

6. The method of claim 1, further comprising presenting the first self-certified control point device identification to an old device in the home network, permitting the control point to copy access control list (ACL) entries from the old device.

7. The method of claim 6, further comprising:
generating a second self-certified control point device identification at the control point, wherein the pseudo-random function uses the control point device identification name and another generated pseudo-random number as inputs for generating the second self-certified control point device identification; and
multicasting the second self-certified control point device identification to a group of devices including the new device but excluding the old device.

8. The method of claim 4, wherein the first self-certified control point device identification is broadcast to all devices managed by the control point using the group secret.

9. The method of claim 1, further comprising:
receiving, by the new device, a list of available control points using a universal plug and play (UPnP) discovery; and
selecting the control point from the list of available control points.

10. The method of claim 9, further comprising:
entering a personal identification number (pin) number for the new device; and
authenticating, by the control point and the new device using a pre-shared transport layer security using the pin as a shared secret between the control point and the new device.

11. A method for copying access control list entries from a first device in a home network to a second device in a home network, the method comprising:
sending a request to access the access control list (ACL) entries from a control point to the first device, the request including a self-certified control point device identification of the control point, the self-certified control point device identification uniquely identifying the control point, wherein the self-certified control point device identification is generated by using a pseudo-random function that uses a generated pseudo-random number and a device identification name as inputs;
accessing the ACL entries on the first device after the first device authenticates the self-certified control point device identification;
sending a request to access an ACL from the control point to the second device, the request including the self-certified control point device identification; and
copying the ACL entries from the first device to the second device after the second device authenticates the self-certified control point device identification.

12. The method of claim 11, further comprising removing the first device from a group by generating a new self-certified control point device identification at the control point but not sending the new self-certified control point device identification to the first device.

13. A control point in a home network, the control point comprising:
means for generating a first self-certified control point device identification at the control point, the self-certified control point device identification uniquely identifying the control point, wherein a pseudo-random function uses a pseudo-random generated number and a device identification name of the control point as inputs for generating the first self-certified control point device identification; and
means for sending a secure message to the new device containing the first self-certified control point device identification.

14. The control point of claim 13, further comprising:
means for receiving a pin number from the new device;
means for using pre-shared transport layer security to authenticate the new device using the pin number as input for the pre-shared transport layer security authentication process;
means for generating a shared secret, by the control point and the new device, between the control point and the new device; and
means for sending a group secret to the new device.

15. The control point of claim 14, further comprising:
means for storing, by the control point, an identification of the new device along with the shared secret in a table, wherein the new device stores the first self-certified control point device identification, the shared secret and the group secret.

16. The control point of claim 13, further comprising means for presenting the first self-certified control point device identification to an old device in the home network, permitting the control point to copy access control list (ACL) entries from the old device.

17. The control point of claim 16, further comprising:
means for generating a second self-certified control point device identification at the control point, wherein the pseudo-random function uses another pseudo-random generated number and the control point device identification name as inputs for generating the second self-certified control point identification; and
means for multicasting the second self-certified control point device identification to a group of devices including the new device but excluding the old device.

18. A control point in a home network, the control point comprising:
means for sending a request to access the access control list (ACL) entries from the control point to the first device, the request including a self-certified control point device identification, the self-certified control point device identification uniquely identifying the control point, wherein the self-certified control point device identification is generated by a pseudo-random function that uses a pseudo-random generated number and a device identification name of the control point as inputs for generating the self-certified control point device identification;

means for accessing the ACL entries on the first device after the first device authenticates the self-certified control point device identification;

means for sending a request to access an ACL from a control point to the second device, the request including the self-certified control point device identification of the control point;

means for copying the ACL entries from the first device to the second device after the second device authenticates the self-certified control point device identification.

19. A program storage device readable by a machine, tangibly embodying a set of computer instructions executable by the machine to perform a method for registering a new device to a control point in a home network, the method comprising:

generating a first self-certified control point device identification at the control point, the self-certified control point device identification uniquely identifying the control point, wherein a pseudo-random function uses a pseudo-random generated number and a device identification name of the control point as inputs for generating the first self-certified control point device identification; and sending a secure message to the new device containing the first self-certified control point device identification.

20. A program storage device readable by a machine, tangibly embodying a set of computer instructions executable by the machine to perform a method for copying access control list entries from a first device in a home network to a second device in a home network, the method comprising:

sending a request to access the access control list (ACL) entries from a control point to the first device, the request including a self-certified control point device identification, the self-certified control point device identification uniquely identifying the control point, wherein the self-certified control point device identification is generated by a pseudo-random function that uses a pseudo-random generated number and a device identification name of the control point as inputs;

accessing the ACL entries on the first device after the first device authenticates the self-certified control point device identification;

sending a request to access an ACL from a control point to the second device, the request including the self-certified control point device identification of the control point; and copying the ACL entries from the first device to the second device after the second device authenticates the self-certified control point device identification.

* * * * *